No. 782,688. Patented February 14, 1905.

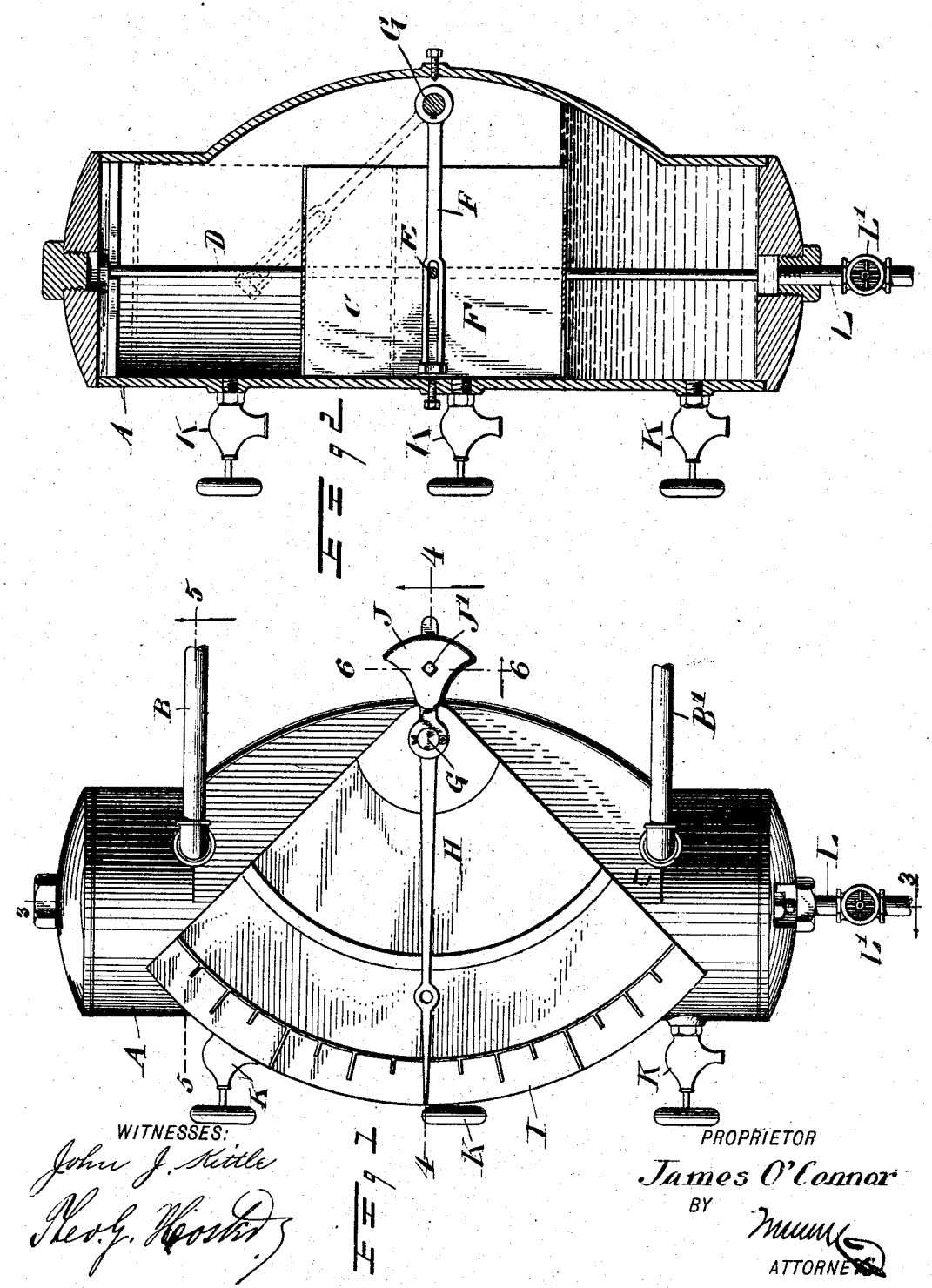

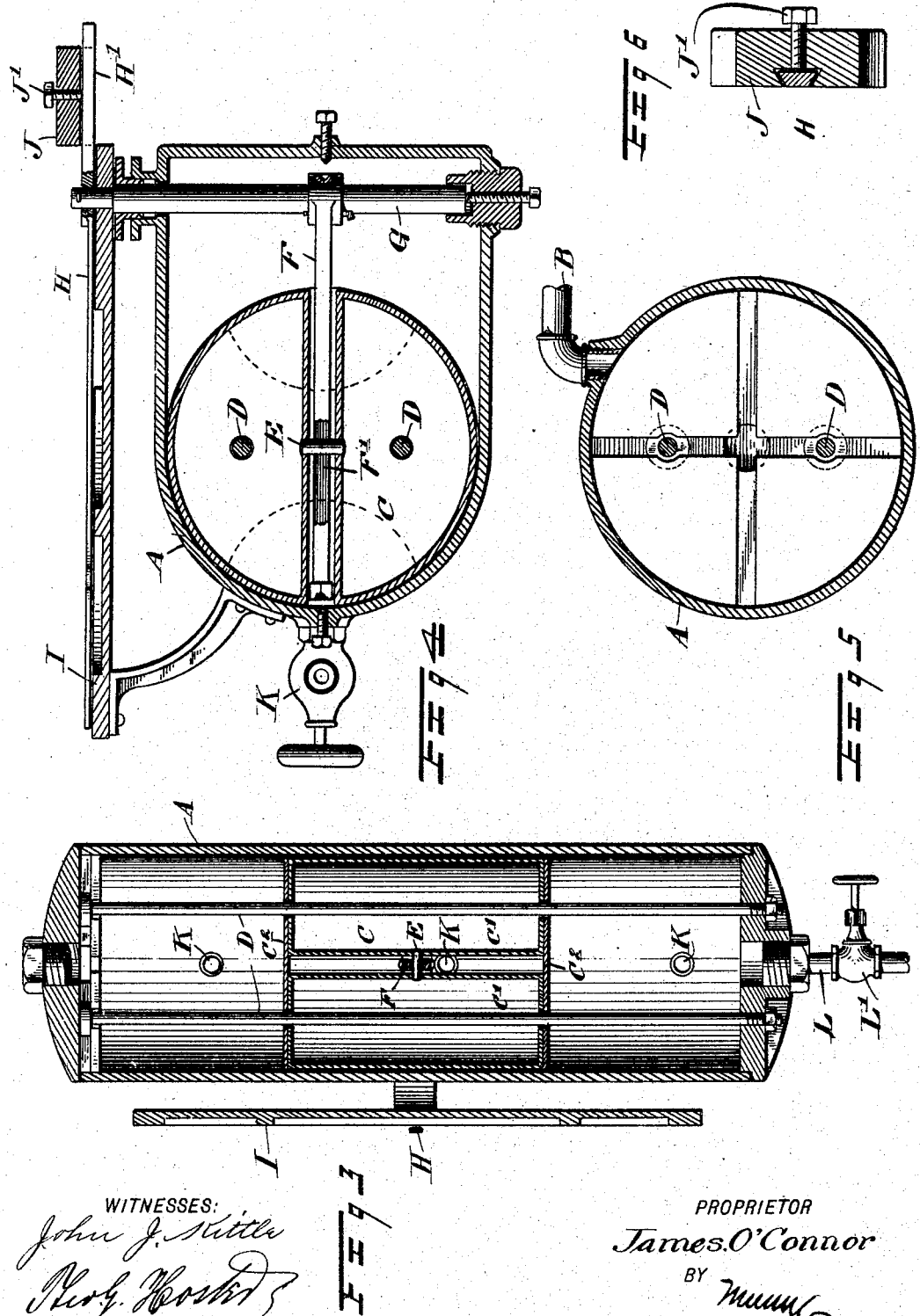

UNITED STATES PATENT OFFICE.

JAMES O'CONNOR, OF NEW ORLEANS, LOUISIANA.

WATER-GAGE.

SPECIFICATION forming part of Letters Patent No. 782,688, dated February 14, 1905.

Application filed August 10, 1904. Serial No. 220,208.

*To all whom it may concern:*

Be it known that I, JAMES O'CONNOR, a citizen of the United States, and a resident of New Orleans, in the parish of Orleans and State of Louisiana, have invented a new and Improved Water-Gage, of which the following is a full, clear, and exact description.

The object of the invention is to provide a new and improved water-gage for steam-boilers and the like which is simple and durable in construction, not liable to break as ordinary glass gages, and arranged to accurately show to the observing engineer the level of the water in the boiler at all times irrespective whether the water is clear or contaminated with oil, sediment, and the like and liable to incrust or cover the inside of an ordinary glass tube and render reading of the glass gage difficult.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a sectional side elevation of the same. Fig. 3 is a transverse section of the same on the line 3 3 of Fig. 1. Fig. 4 is an inverted sectional plan view of the same on the line 4 4 of Fig. 1. Fig. 5 is a like view of the same on the line 5 5 of Fig. 1; and Fig. 6 is an enlarged cross-section of the pointer and its adjustable weight, the section being on the line 6 6 of Fig. 1.

The closed vessel A is connected at its upper and lower portions by pipes B and B' with the steam and water compartments of the boiler on which the gage is to be used to indicate at all times the level of the water in the boiler. Within the vessel A is arranged to rise and fall with the water contained in the vessel a float C, mounted to slide up and down on suitable guideways D, preferably in the shape of rods secured to the upper and lower portions of the vessel A. The float C is preferably made in sections C', spaced apart and connected with each other at top and bottom by connecting-plates C², (see Fig. 3,) and between the spaced sections is arranged a pivot E, fastened to the side walls of the sections, as indicated in Fig. 4. This pivot E extends through an elongated slot F' in an arm F, secured to a shaft G, journaled in the vessel A and extending at one end to the outside thereof, (see Fig. 4,) the outer end of the said shaft carrying a pointer H indicating on a dial I, secured to the vessel A and having its graduation-marks ranging from the water-inlet pipe B' to the steam-inlet pipe B, as plainly indicated in Fig. 1.

In order to insure a proper working of the float C, the arm F, shaft G, and pointer H I prefer to provide the pointer H with a counterbalancing-weight J, held adjustably on the extended end H' of the pointer H, as plainly shown in Figs. 1, 4, and 6. The weight J, after the desired adjustment is made, is secured in position on the extension H' by a suitable set-screw J'.

When the device is in use, the water in the vessel A rises and falls with the water in the boiler and the float C rises and falls with the water in the vessel A, and as the float C is connected by the pivot E with the arm F it is evident that a swinging motion is given to this arm F on the float rising and falling within the vessel A. The arm F turns the shaft G, and as the pointer H is fastened on the shaft it is evident that the pointer indicates on the graduation of the dial I—that is, the pointer shows exactly on the graduation the level of the water in the boiler.

The vessel A is provided with test-cocks K and also with a discharge-pipe L, having a valve L' and leading from the bottom of the vessel A to allow of draining the same of sediment whenever it is desired to do so.

By the arrangement described the engineer in charge of the boiler can at all times see at a glance how the water stands in the boiler by simply noting the position of the pointer H on the graduation of the dial I. As the float C rises and falls with the water irrespective of the condition thereof, it is evident that a proper working of the device is insured.

Having thus described my invention, I claim as new and desire to secure by Letters Patent—

1. A boiler-gage comprising a closed vessel in communication at its upper and lower portions with the steam and water compartments of the boiler, a float having guided movement in the vessel and rising and falling in the said vessel, a shaft journaled on the vessel and carrying within the vessel an arm loosely connected with the said float, a pointer on the outer end of the shaft, and a dial on the outside of the vessel and on which indicates the said pointer.

2. A boiler-gage comprising a closed vessel in communication at its upper and lower portions with the steam and water compartments of the boiler, a float having guided movement in the vessel and rising and falling in the said vessel, a shaft journaled in the vessel and carrying within the vessel an arm loosely pivoted to the said float, a pointer on the outer end of the shaft, a dial on the outside of the vessel and on which indicates the said pointer, and a weight adjustable on the pointer, to counterbalance the latter, the said arm and the float.

3. A boiler-gage comprising a closed vessel in communication at its upper and lower portions with the steam and water compartments of a boiler, a float having guided movement in the vessel and provided with spaced compartments, a shaft journaled on the vessel and provided within the vessel with an arm loosely pivoted to the float between the compartments thereof, a pointer on one end of the shaft and a dial on the outside of the vessel and on which indicates the pointer.

4. A boiler-gage comprising a closed vessel in communication at its upper and lower portions with the steam and water compartments of the boiler, a float having guided movement in the vessel and rising and falling in the said vessel, a shaft journaled on the vessel and carrying within the vessel an arm loosely pivoted to the said float, a pointer on the outer end of the shaft, and a dial on the outside of the vessel and on which indicates the said pointer, the graduation on the dial ranging from the water and steam inlets of the vessel.

5. A boiler-gage comprising a closed vessel in communication at its upper and lower portions with the steam and water compartments of the boiler, a float rising and falling in the said vessel and made in connected sections, spaced apart, guide-rods held in the vessel and engaged by the sections of the float, a shaft journaled on the vessel and carrying within the vessel an arm connected with the said float, between the said sections, a pointer on the outer end of the shaft, and a dial on the outside of the vessel and on which indicates the said pointer.

In testimony whereof I have signed my name to this specification in the presence of two subscribing witnesses.

JAMES O'CONNOR.

Witnesses:
OLIVER S. ZIVANDAIS,
HY. C. FERRIDT.